Patented Dec. 16, 1924.

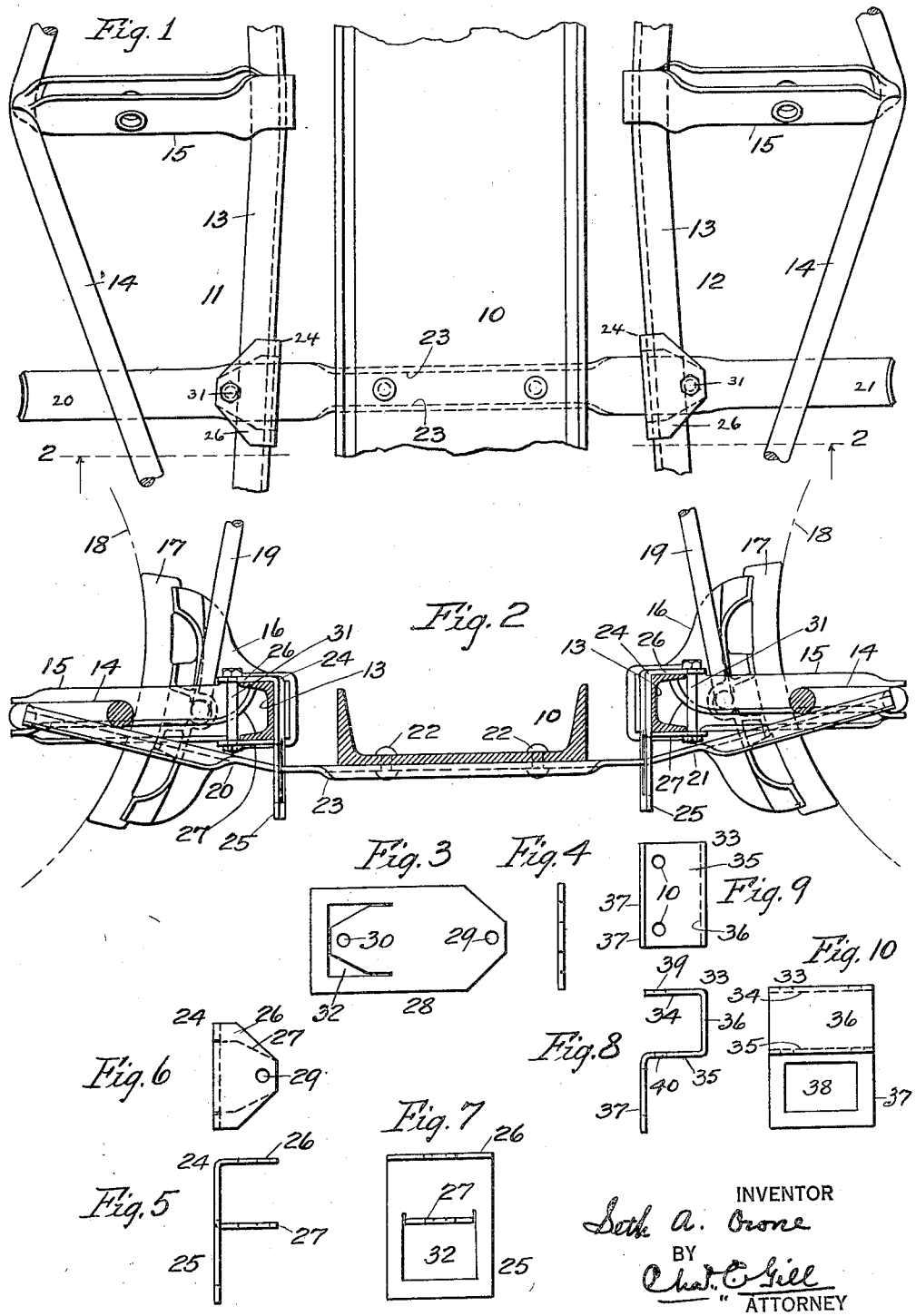

1,519,760

UNITED STATES PATENT OFFICE.

SETH A. CRONE, OF EAST ORANGE, NEW JERSEY.

RAILWAY BRAKE BEAM.

Application filed February 11, 1924. Serial No. 691,889.

*To all whom it may concern:*

Be it known that I, SETH A. CRONE, a citizen of the United States, and a resident of East Orange, in the county of Essex and State of New Jersey, have invented certain new and useful Improvements in Railway Brake Beams, of which the following is a specification.

The invention has reference more particularly to trussed brake-beams and to a four-point suspension therefor, the features constituting the four-point suspension consisting, in addition to the customary hangers, of two tramway-bars secured to the spring plank of the car-truck and extending upwardly and outwardly at opposite sides of the vertical plane of the strut or brake-lever post, below and at a suitable angle to guide the truss-rods at their end portions during the movements of the brake-beams.

Four-point suspension tramway-bars for guiding the beam and assuring the proper application of the brake-shoes to and their release from the wheels are well-known, and one example of such bars is shown in Letters Patent No. 1,475,280 granted to me on November 27, 1923.

My present invention resides in efficient means for connecting the brake-beams to the tramway-bars in such manner that the beams may perform their proper movements and also be prevented in the event of accident to the brake-hangers, from being carried upwardly by the wheels on a service application of the brakes.

My invention is applicable to four-point suspension tramway-bars of various known types and hence is not limited to the specific tramway-bars shown in my aforesaid patent and in connection with which, by way of illustration, I present my invention herein.

The invention will be fully understood from the detailed description hereinafter presented, reference being had to the accompanying drawings, in which:

Fig. 1 is a plan view, partly broken away, of a car truck frame and two inside hung brake-beams, the same embodying the features of my invention;

Fig. 2 is a vertical longitudinal section through the same taken on the dotted line 2—2 of Fig. 1;

Fig. 3 is a plan view of a sheet steel blank which I bend up in dies to form the body-portion of one of the retaining and guiding safety devices I apply to the brake-beam and tramway bar of the four-point suspension for preventing the car wheel in case of accident to the beam hangers, from carrying the disabled end of the beam upwardly over the wheel on a service application of the brakes;

Fig. 4 is an end projection of the same taken from the right hand end of Fig. 3;

Fig. 5 is an edge view, Fig. 6 a plan view and Fig. 7 an outer face view of the body-member I form from the blank shown in Figs. 3 and 4, and Fig. 8 is an edge view, Fig. 9 a bottom view and Fig. 10 an outer face view of a modified construction of body member for the safety device.

In the drawings, 10 designates a portion of a customary spring-plank constituting a portion of a car-truck frame, and 11, 12 denote trussed brake-beams of known type, each comprising a compression member 13, a tension member or truss-rod 14 and a strut 15 adapted to take the usual brake lever, not shown. On the ends of the beams 11, 12 are the usual brake shoe-heads 16 carrying shoes 17 for application to the wheels 18. The heads 16 are suspended by swiveled hangers 19 of customary type.

The brake-beams are supported and guided on tramway bars 20, 21 which provide two means of suspension for the brake beams, these being in addition to the two means of suspension afforded by the hangers 19, and these bars 20, 21 incline upwardly at each side of the spring plank, as usual, and, in the illustration of my invention presented herein, have convex upper end portions to receive the end portions of the truss rods 14 in the manner and for the purposes described in my aforesaid Letters Patent. The tramway bars 20, 21 are formed from the end portions of one integral strip or bar of steel whose middle portions are secured by rivets 22 to the truss-plank 10, and said middle portion of the steel strip or bar is flanged downwardly at opposite side edges, as at 23, for the purpose of stiffening and strengthening the bar at its middle portion.

The operation of the tramway-bars 20, 21 and the general benefits to be derived from their use are fully explained in my aforesaid Letters Patent and therefore the same do not require further comment at this place. The only novelty in respect to the tramway bars presented herein resides in the flanging downwardly, at 23, of the opposite side edges of the strip or bar of steel from which the tramway-bars are constructed.

The main feature of novelty of the present invention resides in the provision of means connecting the compression members of the beams with the tramway-bars 20, 21 so that in the event of accident to the brake-beam hangers, there will be no danger of the car-wheels carrying the brake-shoes upwardly to an undue extent on a service application of the brakes. The means I provide for connecting the compression members of the brake-beams with the tramway-bars will preferably be in the form of sheet metal stirrups 24, each comprising a vertical plate member 25 and two laterally projecting flanges or members 26, 27, respectively, the whole being stamped up from a blank 28 of the form shown in Fig. 3. In regard to the blank, one end portion thereof having a bolt hole 29, is bent laterally to produce the flange or member 26, while within the outlines of the other end of the blank a tongue is cut, and this tongue having a bolt hole 30, is bent laterally to form the flange 27, said flanges 26, 27 being parallel with each other and disposed one above the other. The stirrup 24 is applied to the compression member of the brake-beam in the manner shown in Figs. 1 and 2, the flanges 26, 27 of the stirrup being slipped forwardly upon the beam 13 and closely encompassing three sides of the same, and said stirrup is then secured to the beam by means of a vertical bolt 31 which extends downwardly through the bolt holes 29, 30 in the flanges 26, 27, as shown in Fig. 2, the bolt standing as closely as possible to the outer vertical edges of the beam 13. The depending portion 25 of the stirrup 24 has a commodious opening 32 left therein by the lateral bending of the flange 27 (Fig. 7), and this opening 32 is slipped upon the tramway bar so as to tie the brake beam to said bar and at the same time permit of the proper movements of the beam during the service application of the brakes to and their release from the car wheels. I prefer to form the stirrups 24 each in one integral piece of sheet steel so that their application to the beams and tramway bars and their removal therefrom requires only the application or removal of one movable part, to-wit, the bolt 31. I prefer that the vertical member 25 of the stirrups 24 shall be at the inner edge of the beams 13, as shown in Fig. 2. The stirrups 24 operate as guides and also as means for rendering the brake-beams captive and keeping them under all usual circumstances in proper relation to the tramway bars. There will be one stirrup 24 at each end of each brake-beam so that the beams may be connected at both ends with the tramway bars.

In Figs. 8, 9 and 10 I illustrate a modification of the stirrups for connecting the brake-beams with the tramway bars, and in this modification I form the stirrup, numbered 33, from a sheet of steel by bending a portion of the same laterally to form the beam encompassing member consisting of horizontal flanges 34, 35 and vertical connecting portion 36, and leaving the depending portion 37 of the plate to stand vertically below the inner edge of the compression member 13. The portion 37 of the stirrup 33 has a commodious opening 38 formed therein to slip upon the tramway-bar and the flanges 34, 35 are formed with bolt-holes 39, 40, respectively, to receive bolts corresponding with the bolts 31, shown in Fig. 2, for detachably fastening the stirrups to the compression member of the beam. Figs. 8, 9 and 10 merely show a different method of constructing the stirrup from that indicated in Figs. 3 to 7 inclusive; both forms of stirrups have the same operation and the same utility.

I do not limit my invention to the particular construction of the stirrups for connecting the brake-beams to the tramway-bars, since obviously the details of construction of these stirrups may be modified in many ways without departure from my invention as claimed.

What I claim as my invention and desire to secure by Letters Patent, is:—

1. A trussed brake-beam, inclined tramway suspension-bars therefor and safety means secured to the compression member of the beam and slidably connected with said bars for holding the beam captive with relation thereto.

2. A trussed brake-beam, inclined tramway suspension-bars for the end portions thereof and safety means detachably secured to the end portions of the compression member of the beam and slidably connected with said bars for holding the beam captive with relation thereto.

3. A trussed brake-beam, inclined tramway suspension-bars therefor and safety means rigidly clamped upon the compression member of the beam and having dependent portions transversely enclosing said bars and slidable thereon with the movements of the beam.

4. A trussed brake-beam, inclined tramway suspension-bars therefor and safety means tying the compression member of the beam to said bars and slidable with the beam along said bars.

5. A trussed brake-beam, inclined tramway suspension-bars therefor and safety means secured to the compression member of the beam and slidably engaging said bars for holding the beam captive with relation thereto, said means comprising at each end of said member a stirrup transversely engaging said member and having a depending portion containing an opening through which the bar freely passes.

6. A trussed brake-beam, inclined tramway suspension-bars therefor and safety means secured to the compression member of the beam and slidably engaging said bars for holding the beam captive with relation thereto, said means comprising at each end of said member a stirrup having flanges to pass closely upon the upper and lower surfaces of said member from one side thereof, a removable bolt connecting said flanges at the opposite side of said member and a depending portion having an opening through which the bar freely passes.

7. A trussed brake-beam, inclined tramway suspension-bars therefor and safety means secured to the compression member of the beam and slidably engaging said bars for holding the beam captive with relation thereto, said means comprising at each end of said member a stirrup engaging the inner vertical side of said member and having upper and lower flanges extending forwardly upon the upper and lower surfaces of said member, a bolt connecting said flanges at the forward side of the beam member and a portion depending from the inner side edge of said beam member to and slidably engaging the suspension bar.

8. A trussed brake-beam, inclined tramway suspension-bars therefor and safety means secured to the compression member of the beam and slidably engaging said bars for holding the beam captive with relation thereto, said means comprising at each end of said member a sheet metal device encompassing three sides of said member, a bolt securing the same to said member and engaging the other side thereof and a depending portion containing an opening through which the bar freely passes.

Signed at New York city, in the county of New York, and State of New York, this 9th day of February A. D. 1924.

SETH A. CRONE.